May 27, 1958 R. S. LANGENBACHER 2,836,430
WHEEL HEIGHT ADJUSTMENT FOR LAWN MOWERS
Filed Oct. 29, 1956 2 Sheets-Sheet 1
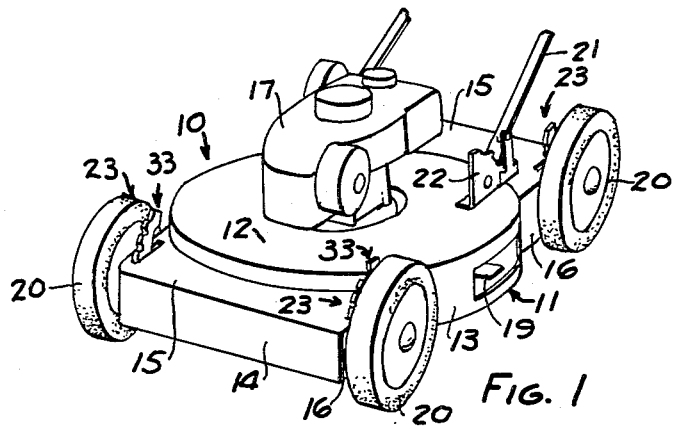
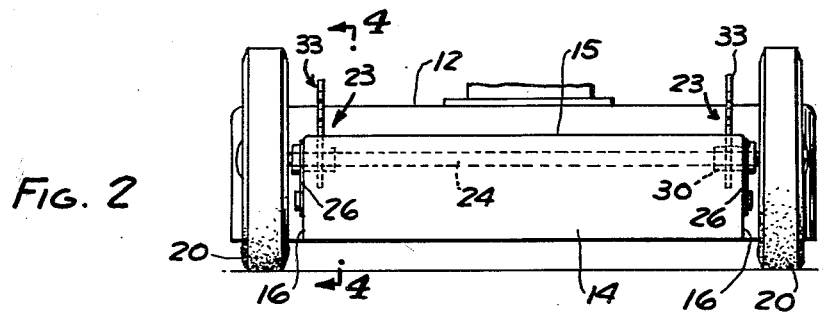
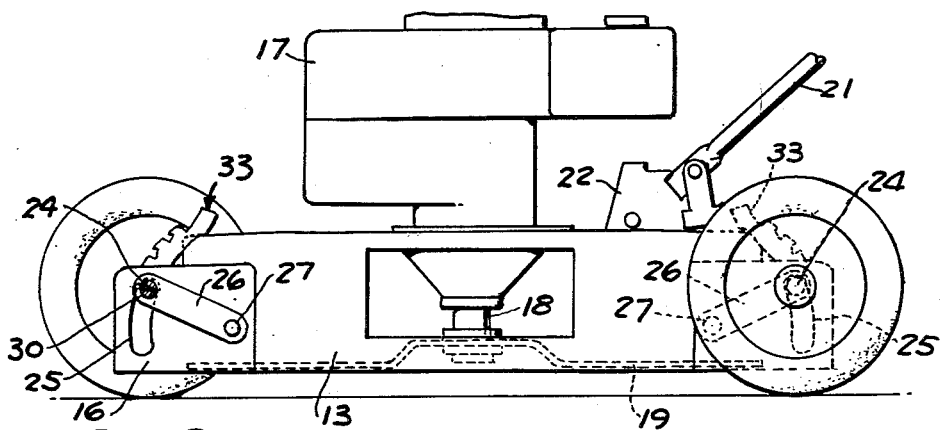
INVENTOR.
ROBERT S. LANGENBACHER
BY
Barnes, Kisselle, Laughlin & Raisch
ATTORNEYS.

INVENTOR.
ROBERT S. LANGENBACHER
BY
Barnes, Kinselle, Laughlin & Raisch
ATTORNEYS.

United States Patent Office 2,836,430
Patented May 27, 1958

2,836,430

WHEEL HEIGHT ADJUSTMENT FOR LAWN MOWERS

Robert S. Langenbacher, Lansing, Mich., assignor to Motor Wheel Corporation, Lansing, Mich., a corporation of Michigan Application October 29, 1956, Serial No. 618,835

3 Claims. (Cl. 280—43)

This invention relates to lawn mowers and particularly to a mechanism for adjusting the position of the wheels on a rotary lawn mower in order to vary the height of the cutting blade.

In rotary lawn mowers, a cutting blade is mounted on the lawn mower frame for rotation about a vertical axis. In one type of rotary lawn mower, the position of the rotary cutting blade relative to the ground is adjusted by changing the vertical position of the supporting wheels relative to the frame or housing of the lawn mower.

It is an object of this invention to provide an improved mechanism for vertically adjusting the position of the rotary cutting blade relative to the ground quickly and without the use of tools by adjusting the position of the wheels relative to the frame.

It is a further object of this invention to provide such adjusting mechanism wherein the adjustment is made in a step-by-step fashion from one position to another.

It is a further object of this invention to provide such a mechanism wherein a multiplicity of adjustments in vertical position are available without making the mechanism large and cumbersome.

It is a further object of this invention to provide such a mechanism which is economical to construct.

In the drawings:

Fig. 1 is a fragmentary perspective view of a lawn mower embodying the invention.

Fig. 2 is a fragmentary front elevational view of the lawn mower.

Fig. 3 is a side elevational view of the same, parts being broken away.

Figure 4:
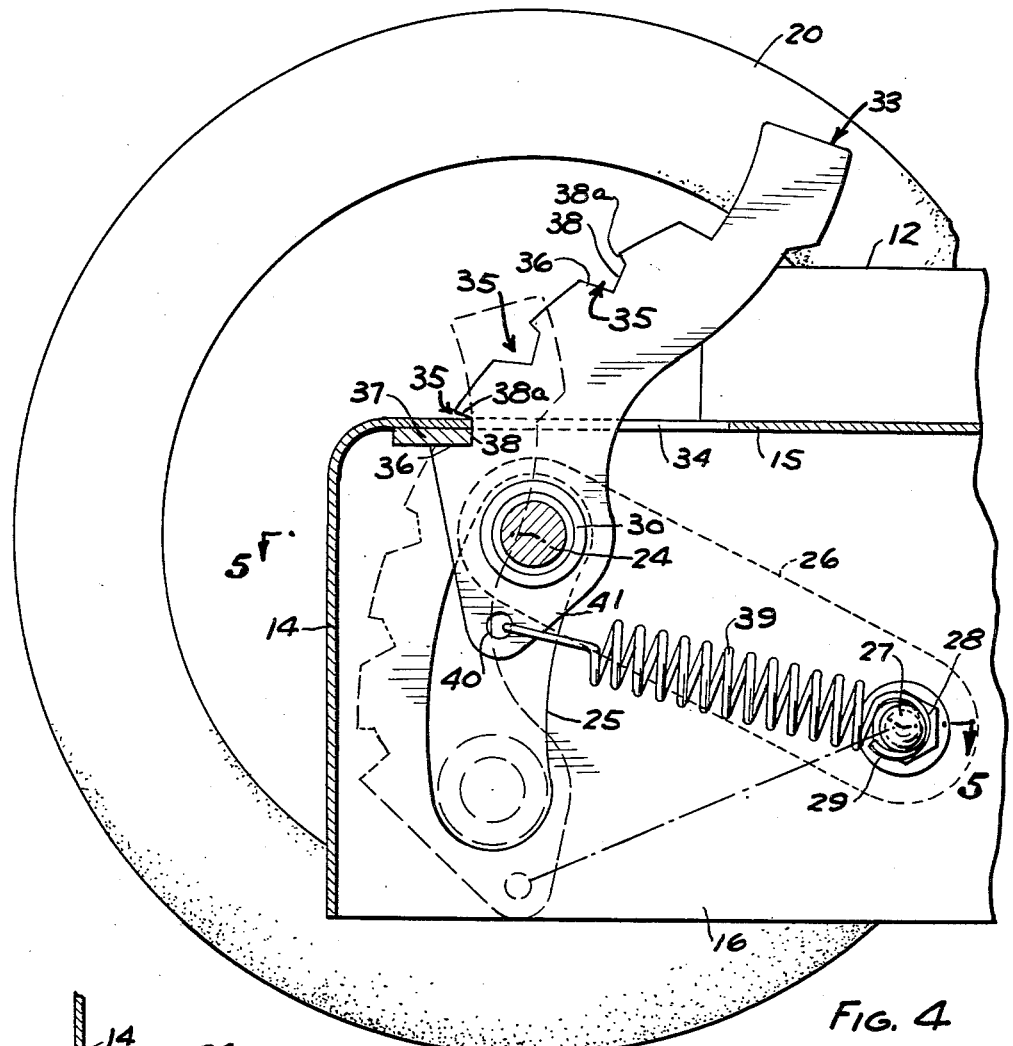
Fig. 4 is a sectional view of the wheel adjusting mechanism on a greatly enlarged scale taken along the line 4—4 in Fig. 2.

Referring to Fig. 1, lawn mower 10 comprises a housing 11 which includes top wall 12, downwardly extending peripheral side walls 13 and downwardly extending end walls 14. End portions 15 of top wall 12 are substantially flat and horizontal and end portions 16 of side walls 13 are substantially flat and vertical. A power unit 17 is mounted on top wall 12 of housing 11 and includes a vertical shaft 18 on the lower end of which a rotary blade 19 is mounted (Fig. 3). Wheels 20 are mounted on the housing adjacent end portions 16 of side walls 13 for supporting the housing for movement along the ground. A handle 21 is pivoted to brackets 22 on top wall 12 of the housing for guiding the lawn mower in its movement along the ground.

A wheel adjusting mechanism 23 is provided for each of the wheels. As shown in Figs. 2, 3 and 4, an axle 24 is mounted at each end of housing 11 with the ends of each axle 24 projecting through arcuate slots 25 in end portions 16 of the side walls 13. A wheel 20 is mounted on each end of axles 24. Each end of axles 24 is supported by an arm 26 which is pivoted to end portion 16 of side wall 13 by means of bolt 27. Bolt 27 is held in position by a nut 28 threaded on bolt 27 and bearing against a washer 29. The axes of each of the bolts 27 at each end of the housing lie on a common horizontal axis. Since the wheel adjusting mechanisms 23 at the front and rear of housing 11 are identical, except for being reversely positioned, only the mechanisms 23 at the forward end of housing 11 will be described.

A bushing 30 is press fitted in the free end of each arm 26 and axle 24 projects through bushings 30. A bearing 31 is positioned between axle 24 and each bushing 30. Each bushing 30 is provided with a flange 32 which bears against the outer surface of arm 26.

A ratchet arm 33 is mounted on each bushing 30 and has the upper end thereof projecting upwardly through an opening 34 in flat end portion 15 of top wall 12. The forward edge of each ratchet arm 33 is curved and is formed with a series of notches or steps 35. Each notch includes a ledge surface 36, a contacting surface 38 at substantially right angles to ledge surface 36 and an overhanging surface 38a extending outwardly from contacting surface 38. Each notch 35 is adapted to have its ledge surface 36 and contacting surface 38 selectively in contact with housing 11 at the forward edge of opening 34. As shown in Fig. 4, the forward edge of opening 34 is reinforced by a bearing plate 37 mounted below the end portion 15 of top wall 12 at the forward edge of opening 34, for example, by riveting or welding. Bearing plate 37 bears successively on each of the ledge surfaces 36. The upper end of each ratchet arm 33 is yieldingly urged toward the forward edge of its respective opening 34 by means of a tension spring 39 having one end thereof fastened to bolt 27 and the other end passing through an opening 40 in a projection 41 on ratchet arm 33.

Figure 5:
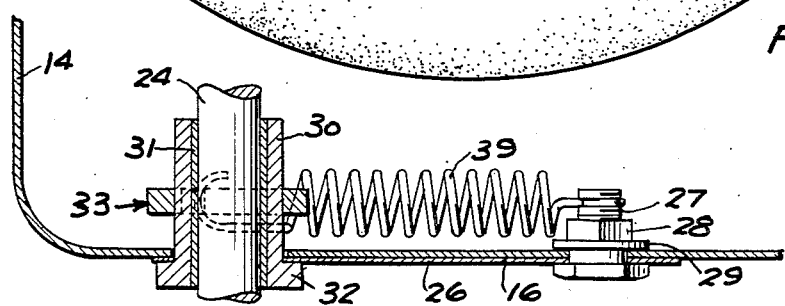
Fig. 5 is a sectional view taken along the line 5—5 in Fig 4.

As shown in Figs. 3 and 5, the center of the radius of curvature of arcuate slot 25 is at the axis of bolt 27 and the width of arcuate slot 25 is slightly greater than the outer diameter of bushing 30 so that arms 26 support each axle 24 for movement in an arc having its center of curvature at the axis of bolt 27. Since one end of spring 39 is mounted on bolt 27, the yielding force on ratchet arm 33 is substantially the same throughout the arcuate movement of axle 24.

Ratchet arm 33 is generally curved so that the forward edge thereof lies on an arc swung about the axis of bolt 27. In addition, the points of intersection of ledge surfaces 36 and contacting surface 38 of notches 35 lie on an arc of smaller radius which is also swung about the axis of bolt 27. In the engaged position, corresponding portions of notches 35 are at the same distance from the axis of bolt 27. Notches 35 are of equal size and each surface of each notch forms an acute angle with the corresponding surface of the notch above it. By this arrangement, ledge surface 36 of the notch 35 which is adjacent opening 34 is always parallel to flat end portion 15.

The position of housing 11 relative to the ground may be readily adjusted from a lower position to a higher position by placing a foot on wheel 20 and lifting housing 11. This causes the edge of slot 34 to ride out of successive notches 35 on ratchet arm 33. This adjustment is a step-by-step adjustment from a lower position to a higher position. The height of the housing may be readily adjusted from a higher position to a lower position by grasping the upper end of ratchet arm 33 and swinging it inwardly toward the center of housing 11 to bring notch 35 which is in engagement with the housing at the forward end of slot 34 out of engagement. The housing will thereby drop to the next notch. Further movement of the ratchet arm inwardly of the housing will permit the housing to drop to the next lower notch.

By mounting one end of spring 39 on bolt 27, the yielding force with which ratchet arm 33 is urged against the edge of slot 34 is the same in the various adjusted positions of axle 24. This permits ratchet arm 33 to be moved with substantially the same force in any of the adjusted positions. Overhanging surface 38a of each notch 35 overlies the edge portion of slot 34 when the notch is in engagement with the forward edge of slot 34 and thereby prevents the accidental overriding of the notch which might occur in normal operation of the lawn mower and which might result in the housing moving upwardly relative to the ratchet arm. I have found that best results are obtained when the angle formed by overhanging surface 38a and ledge surface 36 of a notch 35 is about 45°. With an angle of about 45°, I have found that there is no tendency for the forward edge of slot 34 to accidentally override the overhanging surface 38a of notch 35. At the same time, by making the angle between overhanging surface 38a and ledge surface 36 about 45°, ratchet arm 33 may be readily cammed out of engagement with the edge of slot 34 when the position of housing 11 is adjusted from a lower position to a higher position by placing a foot on wheel 20 and lifting housing 11.

I claim:

1. In a lawn mower, the combination comprising a housing having a top wall and side walls projecting downwardly from said top wall, an arm pivotally mounted on each said side wall adjacent one end thereof and extending forwardly, said arms pivotally moving about a common horizontal axis, each said side wall being formed with an arcuate vertically extending slot, an axle carried by the free ends of said arms and extending through said slots in said side walls, said top wall being formed with a slot adjacent each side wall, the portion of the housing adjacent the forward edge of each slot having a substantially horizontal undersurface, a ratchet arm pivoted on said axle adjacent each side wall and extending upwardly through said slot, each said ratchet arm having an arcuate forward edge formed with notches, each said notch having an upper surface and a lower surface, said lower surface of each notch being generally horizontally disposed when engaging the undersurface of the portion of said housing adjacent the forward edge of said slot, and a spring pivotally urging the forward edge of each ratchet arm in a direction toward the forward edge of the slot in the top wall.

2. The combination set forth in claim 1 wherein the upper surface of each notch is inclined upwardly and forwardly relative to the lower surface at an angle not substantially greater than 45° whereby said upper surface overlies the portion of the housing at the forward edge of the slot when the undersurface of the portion of the housing is engaged by the lower surface of the notch to prevent accidental displacement of the ratchet arm relative to the housing and at the same time to permit the position of the housing relative to the ground to be adjusted from a lower position to a higher position by elevating the housing relative to the wheels and axle to cause the forward edge of said slot to engage said upper surface and cam said ratchet arm out of engagement with a notch and thereby ride over successive notches on the ratchet arm.

3. The combination set forth in claim 1 wherein said spring comprises a tension spring, each said ratchet arm including a short extension extending generally radially and downwardly away from said pivotal connection of said ratchet arm to said axle, one end of each said tension spring being connected to a short extension and the other end being connected to the side wall of the housing at a point lying on the horizontal axis about which the arms are pivoted to the side walls.

References Cited in the file of this patent

UNITED STATES PATENTS

| | | |
|---|---|---|
| 2,214,855 | Hansen | Sept. 17, 1940 |
| 2,680,339 | Murphy | June 8, 1954 |